UNITED STATES PATENT OFFICE.

JOSEF ZIEGLER, OF BIEBRICH, GERMANY, ASSIGNOR TO ADOLF LEMBACH AND ULRICH SCHLEICHER, OF SAME PLACE, AND C. F. WOLFF, OF WIESBADEN, GERMANY.

PROCESS OF PREPARING PHENOL SULPHONATES OF OXYCHINOLINE.

SPECIFICATION forming part of Letters Patent No. 466,707, dated January 5, 1892.

Application filed May 20, 1891. Serial No. 393,485. (Specimens.)

*To all whom it may concern:*

Be it known that I, JOSEPH ZIEGLER, of Biebrich, in the Kingdom of Prussia and German Empire, have invented a new and useful Process for the Preparation of the Ortho or Para Phenol Sulphonates of Ortho-Oxychinoline, of which the following is a specification.

This invention relates to a process for the preparation of the ortho or para phenol sulphonates of ortho-oxychinoline.

Twenty kilos of ortho-amidophenol-parasulphonic acid,

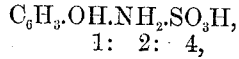

fourteen kilos of orthonitrophenol-parasulphonic acid,

forty kilos of glycerine of 27° to 28° Baumé, and fifty kilos of sulphuric acid of 59° to 60° Baumé are digested together for about six to ten hours in a vessel provided with a stirrer and reverse condenser. The product of the reaction is then allowed to run into two hundred liters of water and the oxychinoline is precipitated from it by soda. The liquid is then filtered off, and the product thus obtained is purified by distillation with steam.

The following shows the chemical process which takes place with separation of sulphuric acid:

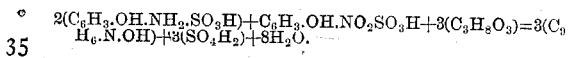

Eleven kilos of the ortho-oxychinoline obtained in the above manner are digested, in a vessel provided with a reverse condenser, with 14.7 kilos of ortho or para phenol sulphonic acid and ten kilos of water until the chemical combination of the two bodies is complete. The reaction is at an end when a sample diluted with water on being distilled with steam no longer yields any oxychinoline in the receiver. This is effected in a few hours. A clear solution of the phenol sulphonate of oxychinoline of a yellow color is then obtained. If it be desired to separate the substance from this solution in a more concentrated form, the water is evaporated off, preferably under diminished pressure, in a vacuum-pan. The phenol sulphonate of oxychinoline thus obtained forms a sirup of a yellow color, which solidifies in the form of yellow crystals only when exposed to a low degree of cold or after having stood for some time in a vacuum-chamber. The substance is soluble in water in all proportions, and under ordinary conditions is thoroughly staple. It is only at a higher temperature, on heating to about 140°, that a decomposition sets in with separation of phenol exactly as in the case of the phenol sulphonic acids. The aqueous solution of the body gives with perchloride of iron precipitates of a very dark green, in fact almost a black, color.

The chemical constitution is expressed by the following formula:

This substance possesses a very powerful anti-bacterical effect and is considered to be of the greatest importance for medical, surgical, and hygienic purposes.

What I claim, and desire to secure by Letters Patent of the United States, is—

A process for the production of the ortho and para phenol sulphonates of ortho-oxychinoline, consisting in the production of ortho-oxychinoline by digesting orthoamidophenol-parasulphonic acid,

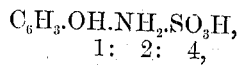

with orthonitrophenol - parasulphonic acid and with glycerine and sulphuric acid, precipitating from the product of the reaction, by means of soda, the oxychinoline formed, and purifying the same, and heating the oxychinoline so obtained with ortho or para phenol sulphonic acid in molecular proportions until the combination of the two bodies is complete, substantially as described.

In witness whereof I hereunto set my hand in presence of two witnesses.

JOSEF ZIEGLER.

Witnesses:
JEAN GRUND,
FRANK H. MASON.